LEWIS T HAWLEY'
and Amos Westcott's
IMPROVED
MILK COOLER

No. 75160 — PATENTED MAR 3 1868

WITNESSES
L. H. Redfield
James S. Leach

INVENTORS
Amos Westcott
Lewis T. Hawley

United States Patent Office.

LEWIS T. HAWLEY, OF SALINA, AND AMOS WESTCOTT, OF SYRACUSE, NEW YORK.

*Letters Patent No. 75,160, dated March 3, 1868.*

IMPROVEMENT IN DEVICE FOR COOLING MILK.

The Schedule referred to in these Letters Patent and making part of the same.

TO ALL WHOM IT MAY CONCERN:

Be it known that we, LEWIS T. HAWLEY, of the town of Salina, in the county of Onondaga, and State of New York, and AMOS WESTCOTT, of the city of Syracuse, in the county and State aforesaid, have invented a new and improved Mode and Device for Cooling Milk or other fluids in jars or vessels, and for transferring such fluids with an improved meter and dipper.

Our invention consists essentially in the employment, in connection with milk-cans or jars of the ordinary construction, of a reservoir and its attachment, for the purpose of holding ice or cold water, and also of a dipper and meter to transfer the fluid from the can to another vessel.

In the construction of this reservoir, we make a vessel corresponding in shape with the curb of the jar or can, so that when snugly fitted into this curb it constitutes a perfect stopper, and in this regard becomes a substitute for the ordinary cover of the can. To the bottom of this cover or stopper there is attached a tube, running down into the can, opening into the stopper and made water-tight, the whole of which, said cap-stopper and tube, forms a receptacle for ice or cold water. The length and size of this tube may be varied according as cooling-surface and material are desired, but generally about one-fifth of the diameter of the can, and two-thirds its depth. This stopper and tube are shown in the annexed drawings at A in Figure 2.

In order to increase the refrigerating powers of the vessel, as above described, we encase the can or jar with a jacket of felt or other suitable covering, which is saturated with water. The cold produced by the evaporation on the surface aids materially to produce the object desired.

It is well known among dairymen that milk taken from the cow with all its animal heat, and placed in large cans, and transported a long distance, either to the city market or to the factory, often, especially in warm weather, becomes much deteriorated, and sometimes entirely destroyed for the purpose of making good butter or cheese.

The inventors claim that the device above described affords a perfect remedy, and that with milk-cans thus constructed and provided, milk may be kept a long time, and may be transported a long distance without impairing its quality or flavor.

Figures 1, 2, 5:
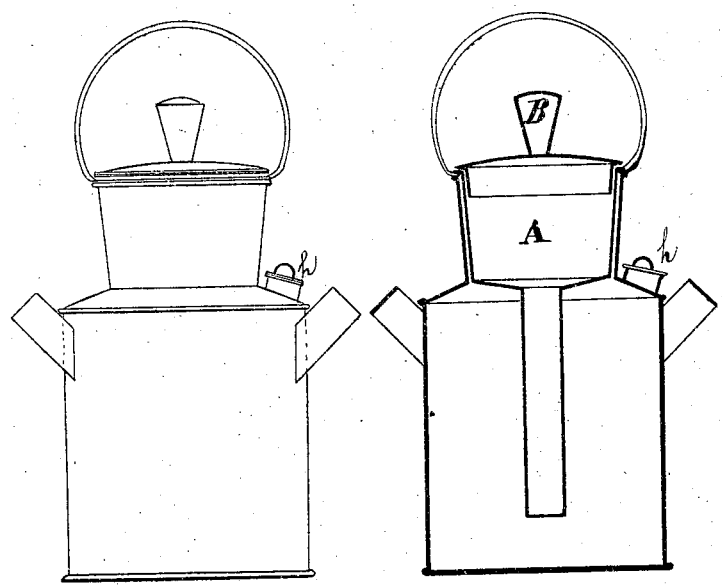

When desirable to retain the ice for a long time, we make the collar of the stopper A, in fig 2, with double walls, and fill the intermediate space with pulverized charcoal or other non-conducting material.

Figure 3:
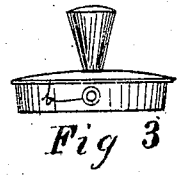

We cover the stopper A, in fig. 2, which is the ice-reservoir, with the supplemental cover B, as shown in Figure 3. This cover is provided with a knob on the collar thereof, as shown at b, in fig. 3, and also a corresponding knob opposite thereto, so that a gentle pressure will spring these knobs below the rim of the vessel to be covered, and thus hold the cover securely and snugly to its place.

We are aware that covering of cloth has been used on tin and other vessels for the purpose of cooling fluids contained therein, by means of evaporation, and we therefore claim no patent for that; but What we do claim as our invention, and desire to secure by Letters Patent, is—

1. The felt jacket or covering, of other suitable material, in combination with the stopper and ice-reservoir A, arranged substantially as and for the purpose above set forth.

2. We claim the reservoir for ice or cold water A, constructed and arranged substantially as above described, and for the purpose above specified.

3. We claim the knobs on the collar of the cover, substantially as and for the purpose above set forth.

LEWIS T. HAWLEY,
AMOS WESTCOTT.

Witnesses:
JAS. S. LEECH,
DAVID P. MURPHY.